Sept. 12, 1933.  R. C. HAWLEY  1,926,335
STEERING COLUMN SWITCH AND WIRING ASSEMBLY
Filed Dec. 2, 1932
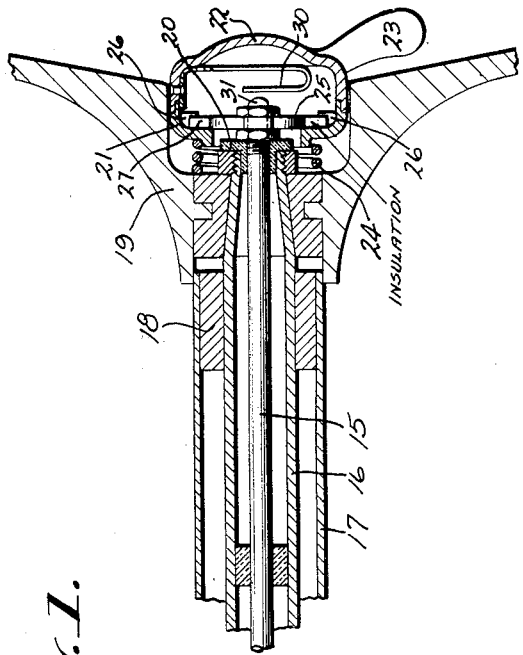
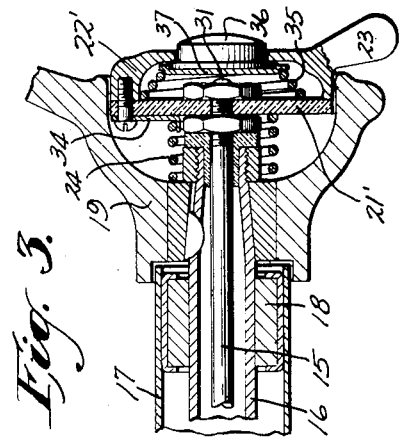
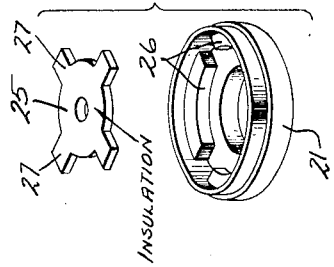
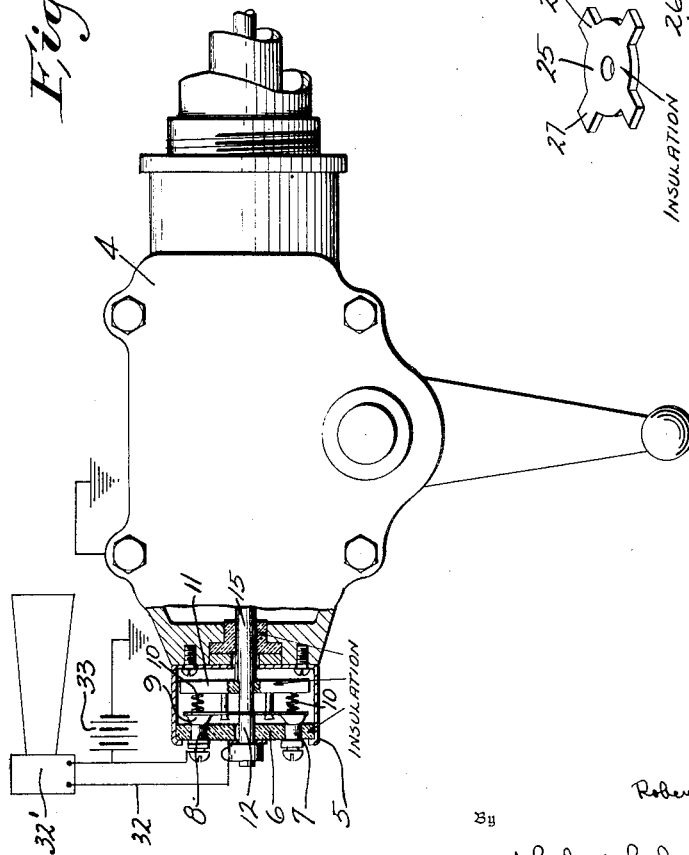
Inventor
Robert C. Hawley
By
Wheeler, Wheeler and Wheeler
Attorneys Patented Sept. 12, 1933

1,926,335

UNITED STATES PATENT OFFICE 1,926,335

STEERING COLUMN SWITCH AND WIRING ASSEMBLY

Robert C. Hawley, Milwaukee, Wis., assignor to Hannum Manufacturing Company, Milwaukee, Wis., a corporation of Wisconsin Application December 2, 1932. Serial No. 645,365

12 Claims. (Cl. 200—59)

This invention relates to improvements in steering column switch and wiring assemblies for vehicles.

It is the primary object of the invention to minimize the expense of wiring steering columns for lighting and horn switch controls. It is customary to use a rock shaft extending through the steering column for the control of throttle, timer, or so-called under-column switches. In all such installations it has been usual to mount a horn switch at the center of the steering wheel and to extend the wiring therefor upwardly through the column.

The present invention seeks to eliminate the wiring (heretofore used for the horn switch) by insulating the rock shaft and using it as one of the electrical conductors momentarily connected when the horn button is operated. In one embodiment of the invention the rock shaft handle itself comprises a button through which the horn switch is closed, while, in a different embodiment of the invention, a separate push button is provided at the center of the rock shaft control member. In each case the control shaft is insulated from the steering column and is electrically connected with a horn or other accessory to be controlled. The pressure of the push button at the top of the steering column grounds the control shaft, thereby completing a circuit which actuates the horn or other device.

In the drawing:

Figure 1 shows a steering column partially broken away to an axial section to expose the parts concerned with the invention.

Figure 2 is a detail view showing in perspective the separate component parts used to insulate the control shaft from the remainder of the column while transmitting movement between the lighting switch control shaft and the handle which is used to operate the lighting switch.

Figure 3 is a fragmentary detail in axial section showing a modified embodiment of the upper end of the steering column.

Like parts are identified by the same reference characters throughout the several views.

Since the details of the steering gear do not enter into this invention the mechanism within the steering gear case 4 is not disclosed. To the end of the gear case is secured a switch casing 5 which may house rotatable switch mechanism of any desired sort. The mechanism shown includes a head 6 in which are mounted the relatively fixed contacts 7 and 8, with respect to which a contact 9 floated by springs 10 from a contact actuator 11 is oscillatable. The dielectric actuating disk 11 is fixed for rotation with the flattened end portion 12 of a switch actuating shaft 15 extended through the steering gear and through the gear drive shaft 16 to the top of the steering column 17. The use of shaft 15 to control a light switch merely exemplifies its possible functions.

The tubular, gear-driving shaft 16 is guided by bushing 18 at the top of the column and carries a steering wheel of which the hub is illustrated at 19. Within the tubular shaft 16 is a dielectric bushing 20 supporting the upper end of the rock shaft 15 which controls the light switch.

The operating handle for the light switch comprises a two part casing including casing portion 21, preferably made of metal, and casing portion 22, preferably made of insulating material. The latter casing portion carries a short lever 23. The whole assembly is pressed axially by a compression spring 24.

The horn switch casing, which comprises the lighting switch handle, is splined to the lighting switch rock shaft 15 by means of a cruciform dielectric member 25 mounted on the end of rock shaft 15 and lugs 26 spaced within the casing element 21 to receive the arms 27 of the cruciform dielectric member 25. Thus, when lever 23 is manipulated by the operator in a rotative direction about the axis of shaft 15, the said shaft is caused to turn on its axis, thereby moving the contact member 9 with respect to the fixed contacts 7 and 8 of the terminal head of the switch at the lower end of the column. If, however, the casing is depressed against the compression of spring 24, a spring contact arm 30 within the casing is caused to engage a contact boss 31 at the end of rock shaft 15 to ground the rock shaft 15 through spring arm 30 and casing element 21 and spring 24 to the steering column which will be understood to be grounded to the frame of the car or elsewhere.

The rock shaft 15 is connected with a lead 32 to the horn 32' or other appliance to be operated by the switch at the head of the column. The opposite terminal of the horn or other appliance will be connected with a battery diagrammatically illustrated at 33, one side of which is grounded and the other side of which may supply current to contact 8 of the lighting switch in the usual manner.

In the construction shown in Fig. 3 the horn switch casing element 21' comprises a dielectric plate which is made fast to the upper end of the lighting switch rock shaft 15, while the cover element of this casing, 22′, is made of metal and grounded by means of a conductor 34 to the compression spring 24.

A second compression spring 35 is used to support the push button 36 which carries a contact plate 37 adapted to engage the aforesaid boss 31 on the end of the lighting switch rock shaft 15. Thus, the rock shaft 15 will be grounded when the button 36 is depressed and, since the rock shaft 15 is insulated from the rest of the steering column, as above described, it may be used to control any desired circuit, such as the horn circuit shown in Fig. 1.

By means of the present invention considerable expense in the manner of wiring the steering column is saved and all of the wiring is concentrated at the under-column switch. In effect, the steering column is furnished to the automobile manufacturer completely wired, without requiring any wiring either on the part of the concern that makes the steering gear or on the part of the automobile manufacturer. Numerous modifications may be made without departing from the spirit of the proposed invention and without sacrificing the desirable objectives above noted.

I claim:

1. In a steering column switch assembly, the combination of a steering column, a rock shaft extending therethrough, and a switch including contacts relatively movable axially of said rock shaft and to one of which said rock shaft is connected.

2. In a steering column switch assembly, the combination with a rock shaft insulated from said column, of a switch at the top of said column including a contact connected with said rock shaft and a second contact grounded and adapted to engage the contact connected with the rock shaft.

3. In a steering column switch assembly, the combination with a tubular steering gear shaft and a control shaft housed therewithin and insulated therefrom, of a lighting switch at the lower end of the column provided with a contact element operatively connected to receive movement from said control shaft and insulated therefrom, a switch casing connected with said rock shaft for the manipulation of said lighting switch element, and conductive means mounted on said casing for contacting said rock shaft whereby to complete an electrical circuit therethrough.

4. In a steering column assembly, the combination with a control shaft and means electrically insulating said shaft, of contact means at the top of said column engageable with said shaft whereby to complete an electrical circuit including said shaft.

5. In a steering column assembly, the combination with a control shaft and means electrically insulating said shaft, of a switch casing comprising a handle for the oscillation of said shaft, and means connected with said casing for electrically grounding said shaft whereby to complete a circuit including said shaft.

6. In a steering column assembly, the combination with an under-column switch, of a switch control shaft having a terminal contact at its end and provided with means electrically insulating said shaft, and a switch casing comprising a handle for the oscillation of said shaft and a contact within said casing engageable with the contact at the end of said shaft for closing a circuit including said shaft.

7. In a steering column assembly, the combination with a control shaft for an under-column switch and means for electrically insulating said shaft, of means at the end of said column for closing an electrical circuit including said shaft.

8. In a steering column assembly, the combination with a steering column and an under-column switch applied thereto and including a rotatable contactor, of a switch actuating rock shaft operatively connected with said contactor and insulated therefrom and from said column, said shaft having its end provided with an electrical connection below said column and an electrical terminal above said column, of means at the head of said column for oscillating said rock shaft to control the rotatable contactor of said under-column switch, and means at the head of said column for closing an electrical connection with said rock shaft whereby to complete an electrical circuit including the rock shaft.

9. In a device of the character described, the combination with a steering column, of an under-column switch provided with a rotatable contact element, a rock shaft operatively connected with said element for the rotation thereof and provided with means electrically insulating it from said contact element and column, an electrical connector carried by said rock shaft adjacent said switch, an electrical contact connected with said rock shaft at the top of the column, a handle operatively connected with said rock shaft for the oscillation thereof and comprising a switch casing, and switch means within said casing operatively adapted for manual manipulation to close a circuit including the contact connected with the top of said rock shaft.

10. In a device of the character described, the combination with a steering column, of an under-column switch provided with a rotatable contact element, a rock shaft operatively connected with said element for the rotation thereof and provided with means electrically insulating it from said contact element and column, an electrical connector carried by said rock shaft adjacent said switch, an electrical contact connected with said rock shaft at the top of the column, a handle operatively connected with said rock shaft for the oscillation thereof and comprising a switch casing, and switch means within said casing operatively adapted for manual manipulation to close a circuit including the contact connected with the top of said rock shaft, said casing being bodily movable to close said circuit.

11. In a steering column assembly, the combination with an insulated rock shaft, an under-column switch including mechanism connected with said rock shaft for oscillation thereby, of a handle for said rock shaft comprising a casing splined thereto and provided interiorly with a grounded contact engageable with said rock shaft to close a circuit therethrough.

12. In a steering column assembly, the combination with a rock shaft and an operating handle therefor comprising a switch casing, of bushing means insulating said rock shaft, a contact for said rock shaft within the casing, a button projecting from the casing, and contact means connected with said button and engageable with the contact of said rock shaft to close a circuit therethrough.

ROBERT C. HAWLEY.